(12) United States Patent
Jensen et al.

(10) Patent No.: US 10,803,876 B2
(45) Date of Patent: Oct. 13, 2020

(54) COMBINED FORWARD AND BACKWARD EXTRAPOLATION OF LOST NETWORK DATA

(71) Applicant: Microsoft Technology Licensing, LLC, Redmond, WA (US)

(72) Inventors: Soren Skak Jensen, Vancouver (CA); Sriram Srinivasan, Sammamish, WA (US); Koen Bernard Vos, Singapore (SG)

(73) Assignee: Microsoft Technology Licensing, LLC, Redmond, WA (US)

( * ) Notice: Subject to any disclaimer, the term of this patent is extended or adjusted under 35 U.S.C. 154(b) by 116 days.

(21) Appl. No.: 16/231,191

(22) Filed: Dec. 21, 2018

(65) Prior Publication Data
US 2020/0202872 A1 Jun. 25, 2020

(51) Int. Cl.
*G10L 19/00* (2013.01)
*G10L 19/005* (2013.01)
*G10L 19/16* (2013.01)

(52) U.S. Cl.
CPC .......... *G10L 19/005* (2013.01); *G10L 19/167* (2013.01)

(58) Field of Classification Search
CPC ....... G10L 21/057; G10L 25/60; G10L 25/93; G10L 19/008; G10L 19/00; G10L 19/005; G10L 19/02; G10L 19/018; G10L 19/20
See application file for complete search history.

(56) References Cited

U.S. PATENT DOCUMENTS

| | | | | |
|---|---|---|---|---|
| 5,353,059 A | * | 10/1994 | Lawlor | H04N 5/926 348/607 |
| 5,673,363 A | * | 9/1997 | Jeon | G10L 19/005 704/270 |
| 5,907,822 A | * | 5/1999 | Prieto, Jr. | G10L 19/005 704/202 |

(Continued)

FOREIGN PATENT DOCUMENTS

| | | |
|---|---|---|
| KR | 101452635 | 10/2014 |
| WO | WO 03026136 | 3/2003 |
| WO | 2008066265 A1 | 6/2008 |

OTHER PUBLICATIONS

"Non-Final Office Action Issued in U.S. Appl. No. 16/231,167", dated Mar. 9, 2020, 8 Pages.

(Continued)

*Primary Examiner* — Edgar X Guerra-Erazo
(74) *Attorney, Agent, or Firm* — Klarquist Sparkman, LLP

(57) ABSTRACT

Techniques are described for performing forward and backward extrapolation of data to compensate for data that has been lost due to network packet loss. The forward and backward extrapolation can be used to perform packet loss concealment. For example, when network packet loss is detected, network packets before and after the lost data can be identified. Forward and backward extrapolation can then be applied to cover the period of lost data. For example, the network packets before the period of lost data can be used to perform forward extrapolation to cover a first portion of the period of lost data. The network packets after the period of lost data can be used to perform backward extrapolation to cover a remaining portion of the period of lost data. The period of lost data can be reconstructed based at least in part on the extrapolation.

20 Claims, 9 Drawing Sheets

(56) References Cited

U.S. PATENT DOCUMENTS

| | | | |
|---|---|---|---|
| 6,124,898 A | 9/2000 | Patel et al. | |
| 6,597,961 B1* | 7/2003 | Cooke | G10L 19/005 700/94 |
| 6,601,206 B1* | 7/2003 | Marvasti | H03M 13/6312 708/404 |
| 6,952,668 B1* | 10/2005 | Kapilow | G10L 19/005 341/94 |
| 6,973,425 B1* | 12/2005 | Kapilow | G10L 19/005 375/316 |
| 6,985,856 B2* | 1/2006 | Wang | G10L 19/005 704/226 |
| 7,003,448 B1* | 2/2006 | Lauber | G10L 19/005 704/200.1 |
| 7,031,926 B2* | 4/2006 | Makinen | G10L 19/005 704/500 |
| 7,047,187 B2* | 5/2006 | Cheng | G10L 19/005 704/200.1 |
| 7,069,208 B2* | 6/2006 | Wang | G10H 1/0058 704/211 |
| 7,590,525 B2* | 9/2009 | Chen | G10L 19/005 704/211 |
| 7,668,712 B2* | 2/2010 | Wang | G10L 19/08 704/219 |
| 7,693,710 B2* | 4/2010 | Jelinek | G10L 19/00 704/207 |
| 7,805,297 B2* | 9/2010 | Chen | G10L 19/005 704/213 |
| 7,890,322 B2* | 2/2011 | Dai | G10L 19/005 704/226 |
| 7,912,712 B2* | 3/2011 | Shlomot | G10L 19/012 704/226 |
| 8,374,856 B2* | 2/2013 | Kim | G10L 19/005 375/240.27 |
| 2003/0115043 A1* | 6/2003 | Wiese | H04H 40/18 704/200.1 |
| 2003/0177011 A1* | 9/2003 | Yasuda | G10L 21/02 704/265 |
| 2004/0039464 A1* | 2/2004 | Virolainen | G11B 20/10527 700/94 |
| 2005/0044471 A1* | 2/2005 | Chia | H04L 47/2416 714/776 |
| 2005/0049853 A1 | 3/2005 | Lee et al. | |
| 2005/0154584 A1 | 7/2005 | Jelinek et al. | |
| 2005/0228651 A1 | 10/2005 | Wang et al. | |
| 2005/0281334 A1 | 12/2005 | Walker et al. | |
| 2006/0051068 A1* | 3/2006 | Gomila | H04N 19/82 386/263 |
| 2006/0062304 A1* | 3/2006 | Hsia | H04N 19/136 375/240.16 |
| 2006/0093048 A9* | 5/2006 | Taleb | H04L 63/20 375/259 |
| 2006/0262864 A1* | 11/2006 | Shi | H04N 19/132 375/240.27 |
| 2006/0265216 A1* | 11/2006 | Chen | G10L 19/005 704/228 |
| 2006/0271373 A1* | 11/2006 | Khalil | G10L 19/005 704/500 |
| 2007/0027683 A1 | 2/2007 | Sung | |
| 2008/0033584 A1* | 2/2008 | Zopf | G10L 19/005 700/94 |
| 2008/0046235 A1* | 2/2008 | Chen | G10L 19/005 704/228 |
| 2008/0249767 A1 | 10/2008 | Ertan | |
| 2009/0037168 A1 | 2/2009 | Gao | |
| 2009/0248404 A1 | 10/2009 | Ehara et al. | |
| 2009/0319264 A1* | 12/2009 | Yoshida | G10L 19/005 704/230 |
| 2014/0088974 A1 | 3/2014 | Mittal | |
| 2017/0169833 A1 | 6/2017 | Lecomte et al. | |
| 2018/0034583 A1 | 2/2018 | Low et al. | |

OTHER PUBLICATIONS

Kondo, et al., "A Speech Packet Loss Concealment Method Using Linear Prediction", In Journal of IEICE Transactions on Information and Systems vol. 89, Issue 2, Feb. 2, 2006, pp. 806-813.

"International Search Report and Written Opinion Issued in PCT Application No. PCT/US2019/066113", dated Mar. 23, 2020, 13 Pages.

"International Search Report and Written Opinion Issued in PCT Application No. PCT/US19/066112", dated Apr. 3, 2020, 11 Pages.

Xie, et al., "A New Packet Loss Concealment Algorithm in VoIP", In Proceedings of IEEE Advanced Information Management, Communicates, Electronic and Automation Control Conference, Oct. 3, 2016, pp. 1597-1601.

Lam et al., "Selective FEC for Error-Resilient Image Coding and Transmission Using Similarity Check Functions," In *Proceedings of the International Conference on Image Processing*, pp. 3217-3220, Oct. 24, 2004.

Ali et al., "Bandwidth Efficient Adaptive Forward Error Correction Mechanism with Feedback Channel," In *Journal of Communications and Networks*, vol. 16, Issue 3, pp. 322-334, Jun. 2014.

Mei "Combined Forward Error Correction and Error Concealment for Digital Video Transmission," In *Doctoral Dissertation of Concordia University*, 148 pages, Jun. 2001.

* cited by examiner

COMBINED FORWARD AND BACKWARD EXTRAPOLATION OF LOST NETWORK DATA

BACKGROUND

Real-time communication services are used to communication audio, video, and other types of streaming data via a computer network, such as the internet. Real-time communication services rely on the reliable and timely delivery of network packets in order to provide a positive user experience. For example, if a real-time audio communication service that is used for an audio call is experiencing network issues (e.g., lost or late network packets), then the quality of the communication can suffer.

In order to compensate for network packet loss or data corruption, packet loss concealment techniques can be used. For example, in order to compensate for network packet loss, the information from previously received network packets can be used to predict the information in the lost network packets. Interpolation can also be performed to compensate for network packet loss using information in packets before and after the lost network packets. However, both forward prediction and interpolation can produce results that are not effective in covering the lost data (e.g., that produce unnatural sounds when performing packet loss concealment for audio data).

Therefore, there exists ample opportunity for improvement in technologies related to performing network packet loss concealment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for performing forward and backward extrapolation of data to compensate for data that has been lost due to lost network packets. The forward and backward extrapolation can be used to perform packet loss concealment. For example, when network packet loss is detected, network packets before and after the lost data can be identified. Forward and backward extrapolation can then be applied to cover the period of lost data. For example, the network packets before the period of lost data can be used to perform forward extrapolation to cover a first portion of the period of lost data. The network packets after the period of lost data can be used to perform backward extrapolation to cover a remaining portion of the period of lost data. The period of lost data can be reconstructed based at least in part on the extrapolation.

For example, a computing device can perform operations for forward and backward extrapolation of data. The operations can comprise determining that one or more network packets have been lost, where the one or more lost network packets representing a period of lost data. The operations can further comprise identifying one or more first network packets before the one or more lost network packets and one or more second network packets after the one or more lost network packets. The operations can further comprise performing forward and backward extrapolation, including extrapolating forward from data of the one or more first network packets to cover a first portion of the period of lost data, and extrapolating backward from data of the one or more second network packets to cover a remaining portion of the period of lost data. The operations can further comprise reconstructing the lost data based at least in part on the extrapolated first portion and the extrapolated remaining portion.

As described herein, a variety of other features and advantages can be incorporated into the technologies as desired.

DETAILED DESCRIPTION

Overview

Figure 1:
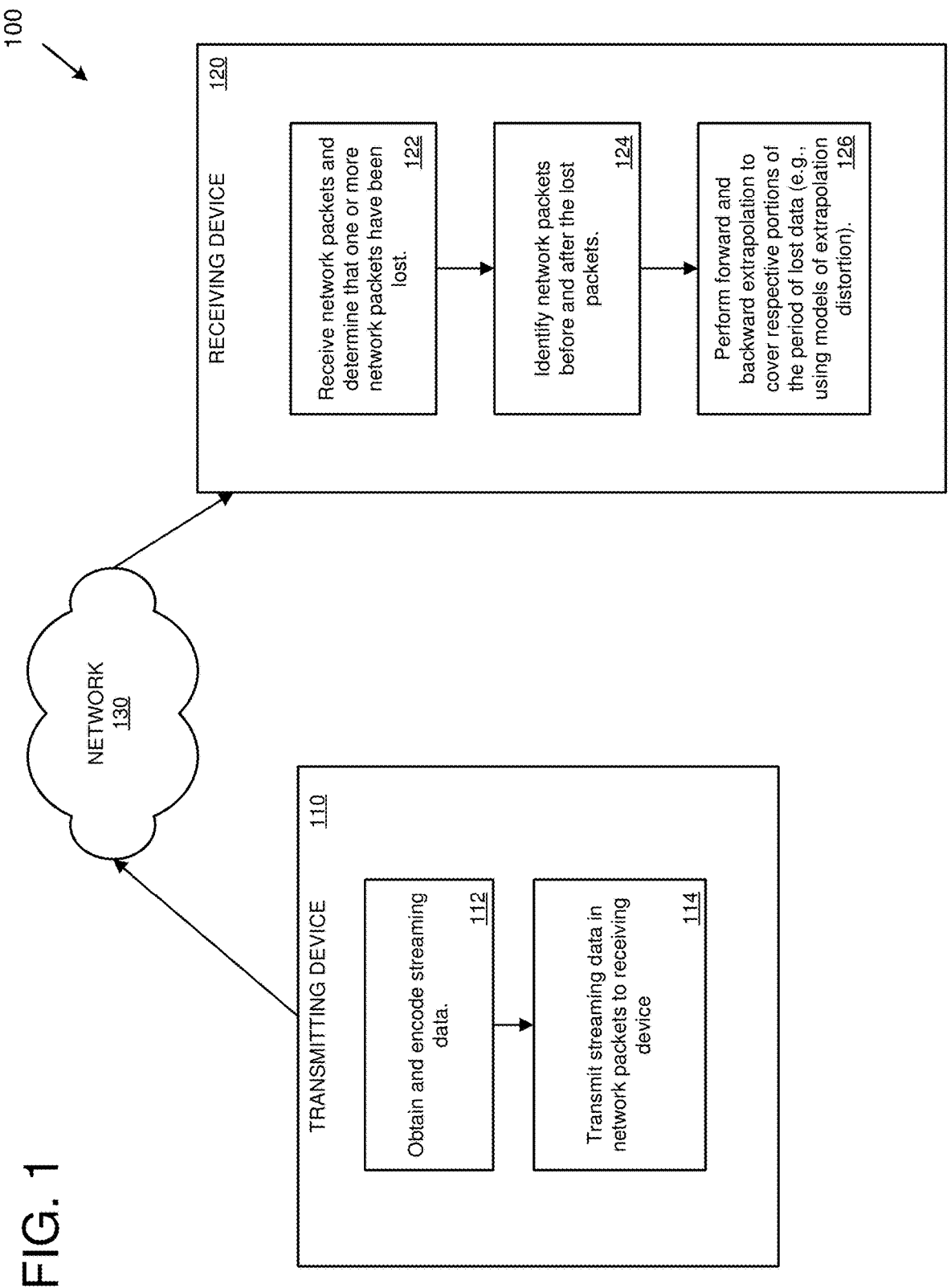
FIG. 1 is a diagram depicting an example environment for performing forward and backward extrapolation of data to cover a period of lost network packets.

As described herein, various techniques and solutions can be applied for performing forward and backward extrapolation of data to compensate for data that has been lost due to lost network packets. The forward and backward extrapolation can be used to perform packet loss concealment. For example, when network packet loss is detected, network packets before and after the lost data can be identified. Forward and backward extrapolation can then be applied to cover the period of lost data. For example, the network packets before the period of lost data can be used to perform forward extrapolation to cover a first portion of the period of lost data. The network packets after the period of lost data can be used to perform backward extrapolation to cover a remaining portion of the period of lost data. The period of lost data can be reconstructed based at least in part on the extrapolation.

Forward and backward extrapolation techniques can be applied to real-time communication services, voice over internet protocol (VoIP) application solutions. For example, devices that are receiving network packets as part of a real-time communication session can perform forward and backward extrapolation as part of packet loss concealment.

Typical packet loss concealment solutions include forward extrapolation and interpolation. With forward extrapolation, the data (e.g., the audio signal) used to fill in the gap left by the lost packets is generated from the previously received (e.g., the previously decoded) data. For example, previously received audio data can be extended forward to fill in the gap. Typical solutions that perform forward extrapolation for audio data fill in the gap by repeating internal parameters, such as line spectral frequencies (LSF) and linear prediction coefficients (LPC) which preserve short time correlation, and pitch lag and frequency to preserve long-time correlation. Attenuation of the signal can also be performed (e.g., in the case of long periods of extrapolation).

Interpolation can be used in situations where packet loss is observed and future packets are available at the time the lost packet is to be played out. This is often the case with solutions that use an adaptive jitter buffer because packets will be buffered for smoothing the playout. In this situation, interpolation can be used to generate the missing data (e.g., the missing audio signal) by interpolating the data (e.g., signal) or parameters from the last played out packet and the future packet. In the case of an audio signal, interpolation works well when the two packets are from the same sound because it provides a more natural evolution to the sound. In this case, interpolation can provide better results than forward extrapolation, which can have a tendency to generate buzzy non-evolving sounds. However, when the two packets (the packet before the loss and the packet after the loss) change significantly (e.g., from a voiced sound to an unvoiced sound), interpolation may not provide good results, and a fallback to forward extrapolation can be used.

In the technologies that are described herein, solutions to compensate for network packet loss are applied that use both forward extrapolation and backward extrapolation. The combined approach that uses both forward and backward extrapolation provides advantages over solutions that use only forward extrapolation or that use interpolation. For example, using both forward and backward extrapolation can extend the data (e.g., streaming media, such as audio and/or video) in a more natural way from both the data before and after the packet loss. As one example, if forward extrapolation is performed alone to cover a 100 ms loss period from the last 20 ms frame of audio data, then data and/or audio parameters from the last 20 ms frame of audio data would need to be repeated 5 times, which can sound unnatural. In contrast, performing both forward and backward extrapolation, data and/or audio parameters can be repeated 2.5 times for the forward direction and 2.5 times for the backward direction, which can produce better sounding audio (e.g., due to data and/or parameters being repeated fewer times). In addition, performing both forward and backward extrapolation can produce better results (e.g., more natural sounding audio) than performing interpolation, particularly where the data changes significantly during the loss period (e.g., from voiced to unvoiced speech, or from unvoiced to voiced speech).

Even though the combined approach applies both forward extrapolation and backward extrapolation, the forward extrapolation and backward extrapolation are still performed independent of one another. For example, the forward extrapolation can be performed from the prior network packet (or network packets) without regard to how the backward extrapolation is being performed. Similarly, the backward extrapolation can be performed from the subsequent network packet (or network packets) without regard to how the forward extrapolation is being performed. In this way, the portion of the period of lost data can be filled in using forward extrapolation independent of the portion of the period of lost that is filled in using backward extrapolation. In some implementations, the only area of dependence between forward and backward extrapolation is the point within the period of lost data where the extrapolations meet (e.g., to perform smoothing at or around the meeting point). For example, a smoothing technique can be applied at or around the meeting point so that the transition is more consistent where the forward and backward extrapolation meet. In some implementations, an overlap-add technique is applied at the meeting point.

The location within the period of lost data where the data produced by the forward extrapolation meets the data produced by the backward extrapolation is called the meeting point. In some implementations, the meeting point is a pre-determined value. For example, the meeting point can be half-way (i.e., the middle of the period of lost data). Other pre-determined meeting point values can be used as well (e.g., at a specific location within the period of lost data).

In some implementations, the meeting point is dynamically determined based at least in part on the data of the network packets before the lost packets and/or the data of the network packets after the lost network packets. In some implementations, dynamically determining the meeting point is performed based on how similar the data and/or parameters are for the network packets before the loss (e.g., by calculating a similarity measure indicating how similar the data and/or parameters are) and how similar the data and/or parameters are for the network packets after the loss (e.g., by calculating a similarity measure indicating how similar the data and/or parameters are). For example, if the data and/or parameters in the packet (or packets) before the loss are more similar than the data and/or parameters in the packet (or packets) after the loss (e.g., based on comparison of the similarity measures), then the extrapolation in the forward direction can be performed to cover more of the period of lost data (e.g., more than half of the period of lost data) than the extrapolation in the backward direction. This example can be illustrated using speech parameters. If the speech parameters for the network packet just before the loss indicate a change from unvoiced to voiced speech, and the speech parameters for the three network packets just after the loss are three voiced packets, then the backward extrapolation can be extended to cover more of the period of lost data than the forward extrapolation (e.g., the backward extrapolation could cover 80% or 90% of the period of lost data).

In some implementations, dynamically determining the meeting point is performed based on models of extrapolation distortion, which indicate how distorted the signal is likely to become the further it is extrapolated. For example, models of extrapolation distortion can be determined for both the forward and backward extrapolation directions. Using the models of extrapolation distortion, the total distortion can be minimized to determine the location of the meeting point within the period of lost dat.

Using the technologies described herein, data (e.g., streaming audio and/or video data) can be transmitted efficiently, while still providing for the ability to compensate for errors (e.g., to perform packet loss concealment for lost network packets). For example, data can be transmitted using a streaming protocol that provides reduced latency and that does not guarantee packet delivery. Packet loss concealment can be performed for network packets that are lost (e.g., that have not been received within a period of time) or are otherwise unavailable for processing (e.g., that have been corrupted) in an effective manner. For example, the data before and after the lost packets can be extended using forward and backward extrapolation to perform effective packet loss concealment. In addition, using the forward and backward extrapolation technologies described herein can reduce bitrate and save network bandwidth. For example, because the forward and backward extrapolation techniques can produce better results (e.g., better packet loss concealment), bandwidth that would otherwise be needed for error correction or sending redundant data can be reduced or eliminated.

In some implementations, the data is streaming data (e.g., streaming audio and/or video data) that is encoded and transmitted from the transmitting device to the receiving device according to the real-time transport protocol (RTP). RTP is a network protocol for streaming audio and/or video data using internet protocol (IP) networks. For example, each RTP network packet can contain one or more frames of streaming data.

Parameters

In the technologies described herein, parameters that are derived from data can be used to perform various tasks. For parameters can be used to perform forward extrapolation and/or backward extrapolation. Parameters can also be used when comparing data (e.g., determining a similarity measure) in network packets before and/or after one or more lost packets. Parameters can also be used when modeling extrapolation distortion. The parameters can be obtained from the network packet data (e.g., the data in the network packets can be provided in the format of parameters). The parameters can also be extracted or decoded form the data (e.g., parameters obtained from an audio and/or video decoding process).

In implementations where the data comprises audio data (e.g., streaming audio data), the parameters can include spectral envelope parameters (e.g., linear predictive coding (LPC) parameters or coefficients), energy level, magnitude of the spectrum, and/or other types of parameters.

In implementations where the data comprises speech audio data (e.g., streaming speech audio data), the parameters can include pitch lag information (pitch lag refers to the pitch cycle period for voiced speech), spectral envelope parameters (e.g., linear predictive coding (LPC) parameters or coefficients), energy level, magnitude of the spectrum, information indicating whether the audio is voiced or unvoiced speech, and/or other types of parameters.

Backward Extrapolation

In the technologies described herein, backward extrapolation is used, along with forward extrapolation, in order to extrapolate data to cover a period of packet loss. Specifically, backward extrapolation is used to predict earlier data from data that has been received. The earlier data is data that was generated prior in time to the current data that has been received and from which the backward extrapolation is being performed. For example, in the context of streaming audio, if a first frame is generated at time T, and a subsequent frame is generated at time T+1, then data representing the first frame (e.g., signal data and/or parameters) can be extrapolated (e.g., predicted) using backward extrapolation from the subsequent frame. For example, in the context of streaming speech audio, backward extrapolation can be performed by extending pitch cycles backward from a received frame (or frames) while keeping the rest of the spectral parameters the same.

Backward extrapolation is different from forward extrapolation because with forward extrapolation data is extrapolated from current data to subsequent data (i.e., forward in time). Backward extrapolation is also different from interpolation because with interpolation missing data is reconstructed by calculating data that is in the range between the previous and subsequent data.

Model of Extrapolation Distortion

In the technologies described herein, a model of backward extrapolation can be used to determine how much of the data loss to calculate using forward extrapolation and/or how much data loss to calculate using backward extrapolation. For example, a model of extrapolation distortion can be generated for the forward and/or backward direction, where the model of extrapolation distortion indicates how distorted the audio data will be depending on the audio data (e.g., depending on parameters representing the audio data, such as speech parameters) and the length that will be extrapolated (the length of the data loss to extrapolate in a given direction). The function for extrapolation distortion is generalized as D (P, L), where D is the extrapolation distortion, P are the speech parameters, and L is the length of the signal that will be extrapolated in the given direction. For example, the speech parameters can be from one or more frames that are being extrapolated from (e.g., the one or more frames immediately preceding the lost frames or the one or more frames immediately following the lost frames, depending on which direction is being evaluated).

In some implementations, the speech parameters are represented as vectors. In determining the extrapolation distortion, the length of the vector of the differences between the parameters can be calculated. For example, take a situation where forward extrapolation is being performed from two frames preceding the loss period, one frame 20 ms before the loss and a second frame 40 ms before the loss. From these two frames, two sets of speech parameters can be calculated. If the parameters are vectors, the can be subtracted from each other. The length of the result can then be obtained (e.g., representing a similarity measure). If the parameters are close, the length will be relatively small, otherwise the length will be relatively large.

In some implementations, the parameters are weighted before the extrapolation distortion is calculated. For example, some parameters may be more important to the extrapolation distortion than others, and weighting those parameters higher can improve the accuracy of the extrapolation distortion result.

In some implementations, the model of extrapolation distortion satisfies the constraint L1>L2, which also means D (P, L1)>D (P, L2). In other words, extrapolating to a greater length leads to higher distortion.

Using the model of extrapolation distortion, the optimal amount of forward and backward extrapolation can be determined by minimizing the total extrapolation distortion (also referred to as the overall distortion). Minimizing the total extrapolation distortion is performed according to Equation 1 below. In Equation 1, "fw" is the forward direction, "bw" is the backward direction, and $L_{loss}$ is the total length of the loss period.

$$D(L_{fw}) = \min(D(P_{fw}, L_{fw}) + D(P_{bw}, L_{loss} - L_{fw})) \quad \text{(Equation 1)}$$

Equation 1 identifies the length of the forward extrapolation, $L_{fw}$, that minimizes the equation. The only parameter that changes in Equation 1 is the length of the forward extrapolation. In some implementations, a number of potential lengths of forward extrapolation are considered, and a value that minimizes Equation 1 is selected. For example, the potential lengths of forward extrapolation can be selected from the range of 10% to 90% of the total loss period (e.g., a length representing each of a number of percentage increments, such as every percent or every 5 percent increment, can be evaluated using Equation 1). Other techniques can also be used to determine the length of forward extrapolation that minimizes Equation 1. For example, for certain distortion functions a closed form solution can be found to calculate the optimal extrapolation lengths and thereby the above-mentioned search can be avoided.

In Equation 1, the length of extrapolation in the forward direction is determined, from which the corresponding length of the backward extrapolation can be calculated (the total length of the loss period minus the length of forward extrapolation is the length of backward extrapolation). While Equation 1 is described in terms of determining the length of forward extrapolation for illustration purposes, the length of extrapolation can be determined from either direction. For example, Equation 1 can be modified to determine the length of extrapolation in the backward direction, from which the length of extrapolation in the forward direction can be derived. In other words, calculating the length of extrapolation that minimizes the distortion in either direction will also give the length of distortion in the other direction, which is merely the remaining portion of the loss period.

The following is an example, using simplified data and parameters, illustrating calculation of the extrapolation distortion for both the forward and backward direction, and illustrating determination of the length of forward extrapolation that minimizes Equation 1. In this example, an un-stationary measure USM (P1, P2) is defined describing the un-stationarity content of a speech segment. The measure is based on parameters P1 and P2 extracted in two frames which could be 20 ms apart. In this example the following values are used:

*4 LSF values–representing the vocal tract shape. The values are in the range 0-1.

*1 pitch lag value (pL)–representing the fine harmonic structure. The lags are between 20-320 for speech at 16 kHz. For unvoiced speech there are no fine structures and the lag is set to 0.

*1 per sample energy value in dB (nrg). For 16 bit data this value is in the range 0-90.

The parameters are put into one vector as P=(lsf0, lsf1, lsf2, lsf3, pL, nrg). USM (P1, P2) is now calculated as: USM (P1, P2)=$\|(P1-P2)*w\|$ (i.e. the length of the weighted difference, where w is a weighting factor that can be used to tune the measure). From USM (P1, P2) the distortion is calculated as $D(P, L)=(0.1L)^{1+USM(p1,p2)/20}$, where P is made up by merging P1 and P2.

In the following example a w vector is set to w=(1.0, 1.0, 1.0, 1.0, 0.1, 0.1). Consider an example that has 100 ms worth of lost speech. Before the loss, the following two parameters can be estimated:

P_fw_1=(0.1, 0.2, 0.5, 0.6, 155, −19)
P_fw_2=(0.11, 0.19, 0.6, 0.7, 154, −22)

Then, the following parameters are calculated:

P_fw_1−P_fw_2=(−0.01, 0.01, −0.1, −0.1, 1.0, 3.0)
(P_fw_1−P_fw_2)*w=(−0.01, 0.01, −0.1, −0.1, 0.1, 0.3)
$\|(P\_fw\_1-P\_fw\_2)*w\|$=0.12=USM

Performing 50 ms of forward extrapolation will produce a distortion of:

$$D(P_{fw}, 50)=(0.1\cdot50)^{0.12/30}=0.3$$

After the loss, the following two parameters are estimated:

P_bw_1=(0.21, 0.3, 0.5, 0.6, 0, −30)
P_bw_2=(0.25, 0.32, 0.6, 0.62, 0, −26)

Because pL is 0, this is an unvoiced segment. Similar to the calculations for the forward extrapolation: USM=0.17. And performing 50 ms of extrapolation leads to a distortion number of: D (P_bw, 50)=0.33.

Figure 6:
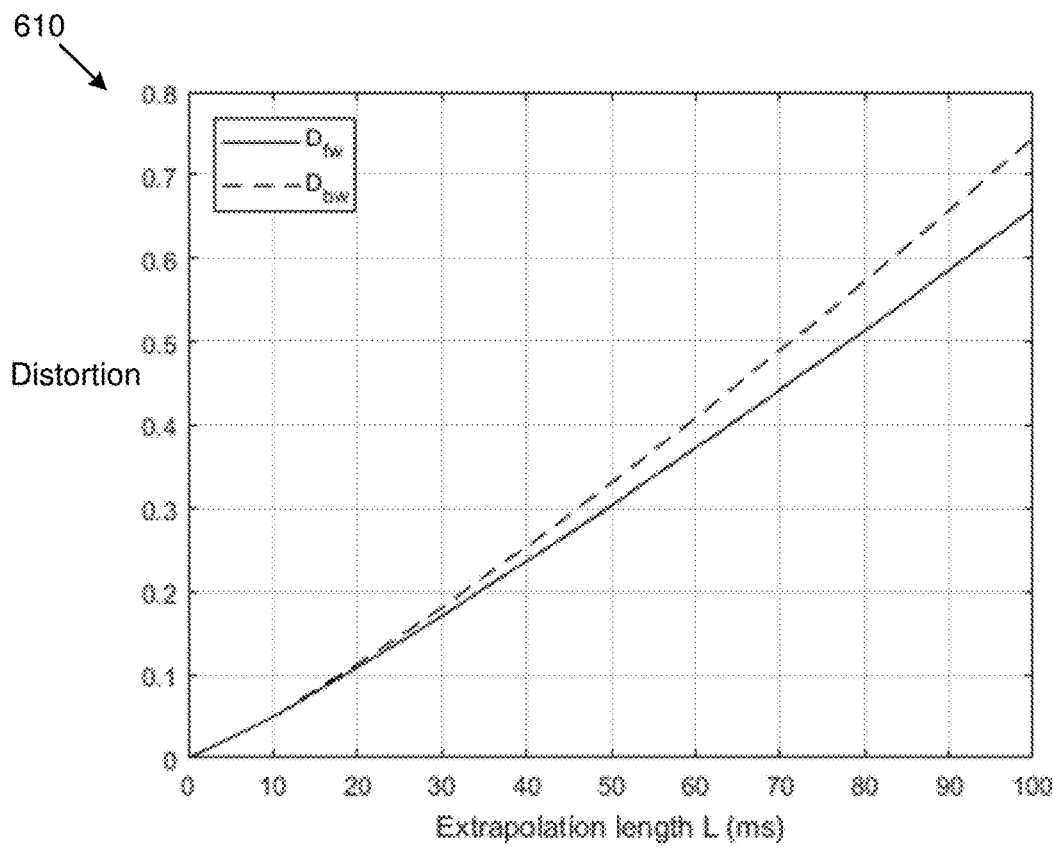
FIG. 6 depicts graphs illustrating example forward and backward extrapolation distortions.
Figure 6:
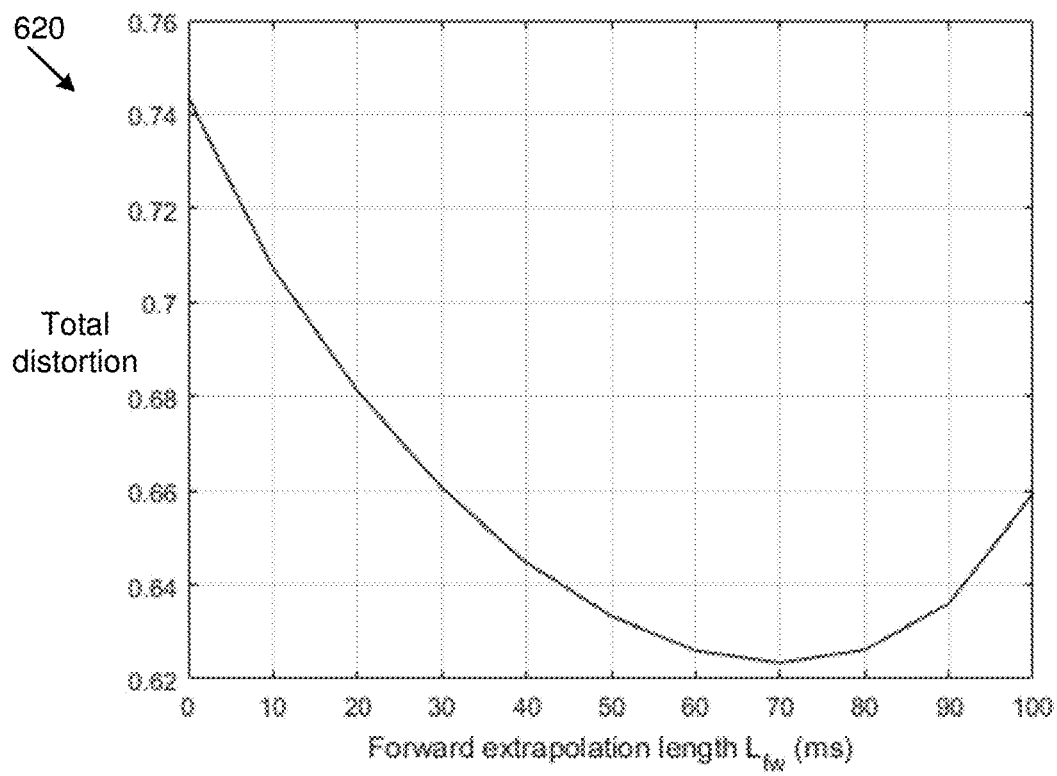

In FIG. 6, the graph at 610 shows the forward and backward extrapolation distortion for different extrapolation lengths based on the above example. The diagram at 620 shows the total distortion (based on the above example) as a function of the forward extrapolation length, given that the lost gap is 100 ms. Based on the graph at 620, the lowest total distortion is obtained by doing 70 ms or forward extrapolation and 30 ms of backwards extrapolation.

Environments for Performing Forward
Extrapolation and Backward Extrapolation

FIG. 1 is a diagram depicting an example environment 100 for performing forward and backward extrapolation of data (e.g., for network packet loss concealment), communicated via a computer network 130, to cover a period of lost network packets. The example environment 100 depicts a transmitting device 110. The transmitting device 110 can be any type of computing device (e.g., server computer, virtual machine, desktop computer, laptop computer, tablet, phone, or another type of computing device) that encodes and transmits data (e.g., streaming audio and/or video data).

As depicted at 112, streaming data is obtained an encoded. For example, the streaming data can be audio and/or video data. For example, the data can be frames of audio data (e.g., frames containing 20 milliseconds (ms) of audio samples) and/or frames of video data. In some implementations, the streaming data is obtained by the transmitting device 110 (e.g., from a microphone and/or camera). For example, the streaming data can be obtained and encoded as part of a real-time communication session (e.g., a VoIP session) between the transmitting device 110 and the receiving device 120. a current portion of data is obtained to be sent in a current network packet to the receiving device 120.

At 114, the streaming data is transmitted in network packets to the receiving device 120. For example, each network packet can contain one or more frames of streaming audio and/or video data. The network packets are sent to the receiving device 120 via the computer network 130 (e.g., the internet and/or other types of private or public computer networks).

In some implementations, the operations depicted at 112-114 are performed by one or more software components (e.g., encoders, network components, etc.) running on the transmitting device 110. For example, the components can be part of a real-time communications application, such as a VoIP application, in which the transmitting device 110 receives frames of data (e.g., audio data) for real-time encoding and transmission to the receiving device 120, where the data is decoded and output.

As depicted at 122, the receiving device 120 receives the network packets transmitted by the transmitting device 110 and determines that one or more of the network packets have been lost. For example, the network packets can be determined to be lost if it they have not been received by the receiving device 120 for a period of time.

At 124, one or more network packets before the lost network packets and one or more network packets after the lost network packets are identified. For example, the network packets before and/or after the lost packets can be stored in a jitter buffer.

At 126, forward and backward extrapolation are performed to cover respective portions of the period of lost data. Specifically, forward extrapolation can be performed from data of the one or more network packets before the lost packets to cover a first portion of the period of lost data. Backward extrapolation can be performed from data of the one or more network packets after the lost packets to cover a remaining portion of the period of lost data. Using the extrapolated data in the forward and backward directions, the period of lost data can be reconstructed (e.g., for playout at the receiving device 120). In some implementations, performing forward and backward extrapolation includes using models of extrapolation distortion to dynamically determine (e.g., based on the data and/or parameters) how much of the period of lost data will be extrapolated in the forward direction and how much will be extrapolated in the backward direction.

In some implementations, the operations depicted at 122-126 are performed by one or more software components (e.g., decoders, network components, etc.) running on the receiving device 120. For example, the components can be part of a real-time communications application, such as a VoIP application, in which the receiving device 120 receives frames of data (e.g., audio data) for real-time decoding and playback by the receiving device 120.

In some implementations, the example environment 100 is an online real-time communication environment in which audio and/or video information is captured at the transmitting device 110 and transmitted to the receiving device 120 for presentation (e.g., as part of a real-time audio and/or video call, conference, meeting, etc.). For example, the online communication environment can comprise a VoIP service. As part of the communication, the receiving device 120 could also transmit audio and/or video back to the transmitting device 110 for presentation (e.g., as part of a two-way audio and/or video call). In addition, a number of other computing device can participate in the communication (e.g., in a conference environment).

Figure 2:
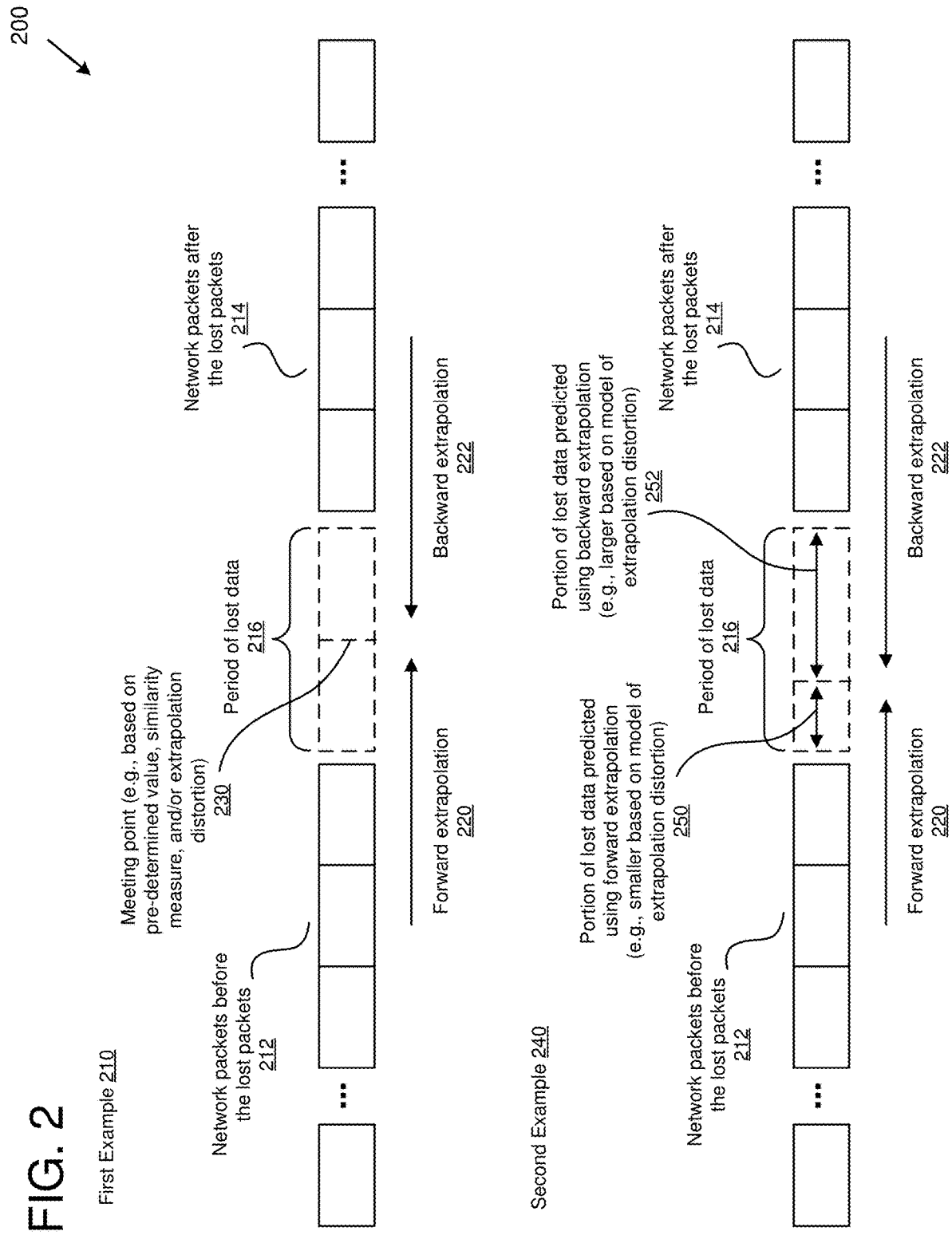
FIG. 2 is a diagram depicting examples of performing forward and backward extrapolation to compensate for a period of lost data due to lost network packets, including using models of extrapolation distortion.

FIG. 2 is a diagram depicting examples 200 of performing forward and backward extrapolation to compensate for a period of lost data due to lost network packets, including using models of extrapolation distortion. In the first example 210, a packet loss event has occurred (e.g., where one or more network packets have not been received for a period of time and/or have been corrupted) resulting in one or more lost network packets. The data from the lost network packets is represented by the period of lost data 216. A number of network packets are depicted before the lost packets 212, and a number of network packets are depicted after the lost packets 214. For example, the number of packets before the lost packets 212 can be network packets immediately prior to the lost packets (e.g., according to network packet sequence numbers and/or other timing or ordering information). The number of packets after the lost packets 214 can be network packets immediately after the lost packets (e.g., according to network packet sequence numbers and/or other timing or ordering information).

In order to compensate for the period of lost data 216 (e.g., to perform packet loss concealment), data from the network packets before the lost packets 212 is extrapolated by performing forward extrapolation 220, and data from the network packets after the lost packets 214 is extrapolated by performing backward extrapolation 222.

The forward extrapolation 220 is performed to cover a first portion of the period of lost data 216 and the backward extrapolation 222 is performed to cover the remaining portion of the period of lost data 216. The point at which the forward extrapolation 220 and the backward extrapolation 222 meet is called the meeting point 230. The meeting potion can be a fixed point (e.g., based on a pre-determined value) or it can be dynamically determined (e.g., based on a similarity measure and/or based on extrapolation distortion).

The second example 240 illustrates how the meeting point within the period of lost data 216 can be dynamically determined. In the second example 240, the portion of the period of lost data 216 that is predicted using forward extrapolation 220 is depicted at 250. The portion of the period of lost data 216 that is predicted using backward extrapolation 222 is depicted at 252. For example, the period predicted using forward extrapolation can be smaller (as depicted at 250) than the period predicted using backward extrapolation (as depicted at 252) due to evaluation of the extrapolation distortion in the forward and backward directions. In the second example 240, the forward extrapolation has a higher extrapolation distortion than the backward extrapolation, and therefore the backward extrapolation extends further than the forward extrapolation.

Methods for Performing Forward and Backward Extrapolation of Data

In any of the examples herein, methods can be provided for performing forward and backward extrapolation of data (e.g., to perform packet loss concealment). For example, forward and backward extrapolation can be performed to cover a period of lost data due to network packet loss.

Figure 3:
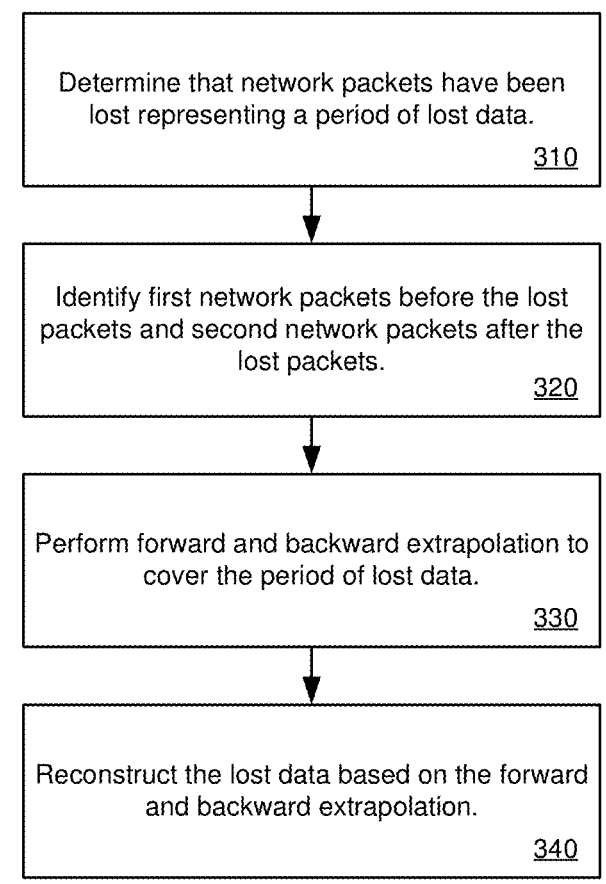
FIG. 3 is a flowchart of an example method for forward and backward extrapolation of data.

FIG. 3 is a flowchart of an example method 300 for performing forward and backward extrapolation of data (e.g., for data received via a computer network). For example, the example method 300 can be performed by a computing device, such as receiving device 210.

At 310, a determination is made that one or more network packets have been lost. The lost network packets represent a period of lost data. For example, the lost data could be one or more frames of audio data, one or more pictures of video data, and/or an amount of another type of data.

At 320, one or more first network packets before the lost packets and one or more second network packets after the lost packets are identified. The one or more network packets before the lost packets are labeled "first" network packets for ease of reference. Similarly, the one or more network packets after the lost packets are labeled "second" network packets for ease of reference.

At 330, forward and backward extrapolation is performed to cover the period of lost data. For example, forward extrapolation can be performed from data of the one or more first network packets to cover a first portion of the period of lost data. Backward extrapolation can be performed from data of the one or more second network packets to cover a remaining portion of the period of lost data.

At 340, the lost data is reconstructed based on the forward and backward extrapolation. For example, the period of lost data can be filled in using reconstructed data and/or parameters that are extrapolated in the forward and backward direction. For example, if the data is audio or video data, the reconstructed data can be stored or used for playback at the computing device.

Figure 4:
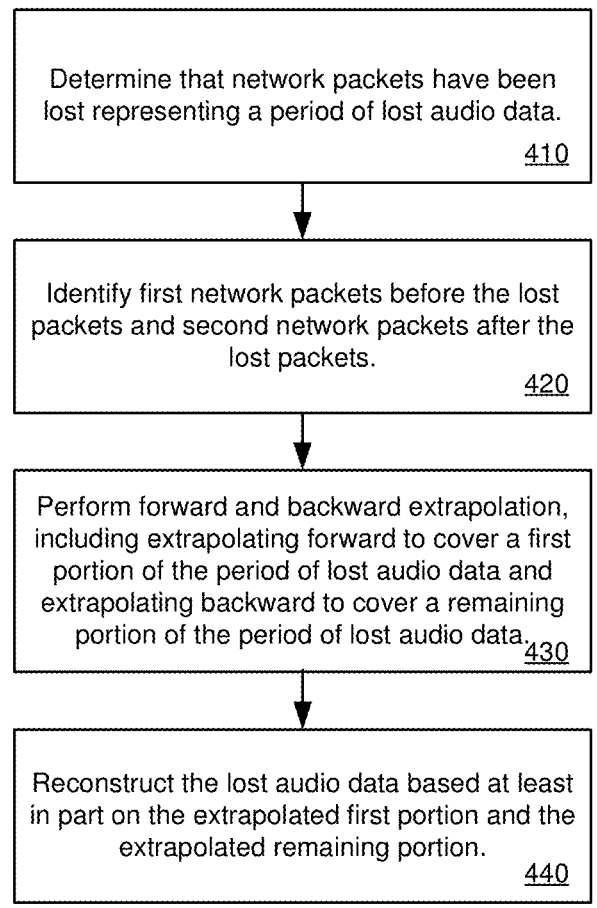
FIG. 4 is a flowchart of an example method for forward and backward extrapolation of audio data.

FIG. 4 is a flowchart of an example method 400 for performing forward and backward extrapolation of audio data (e.g., for data received via a computer network). For example, the example method 400 can be performed by a computing device, such as receiving device 210.

At 410, a determination is made that one or more network packets have been lost. The lost network packets represent a period of lost audio data. For example, the lost audio data could be one or more frames of audio data.

At 420, one or more first network packets before the lost packets and one or more second network packets after the lost packets are identified. The one or more network packets before the lost packets are labeled "first" network packets for ease of reference. Similarly, the one or more network packets after the lost packets are labeled "second" network packets for ease of reference.

At 430, forward and backward extrapolation is performed to cover the period of lost audio data. For example, forward extrapolation can be performed from audio data of the one or more first network packets to cover a first portion of the period of lost audio data. Backward extrapolation can be performed from audio data of the one or more second network packets to cover a remaining portion of the period of lost audio data.

At 440, the lost audio data is reconstructed based at least in part on the extrapolated first portion and the extrapolated remaining portion. For example, the period of lost audio data can be filled in using reconstructed data and/or parameters that are extrapolated in the forward and backward direction. The reconstructed data can be stored or used for playback at the computing device.

Figure 5:
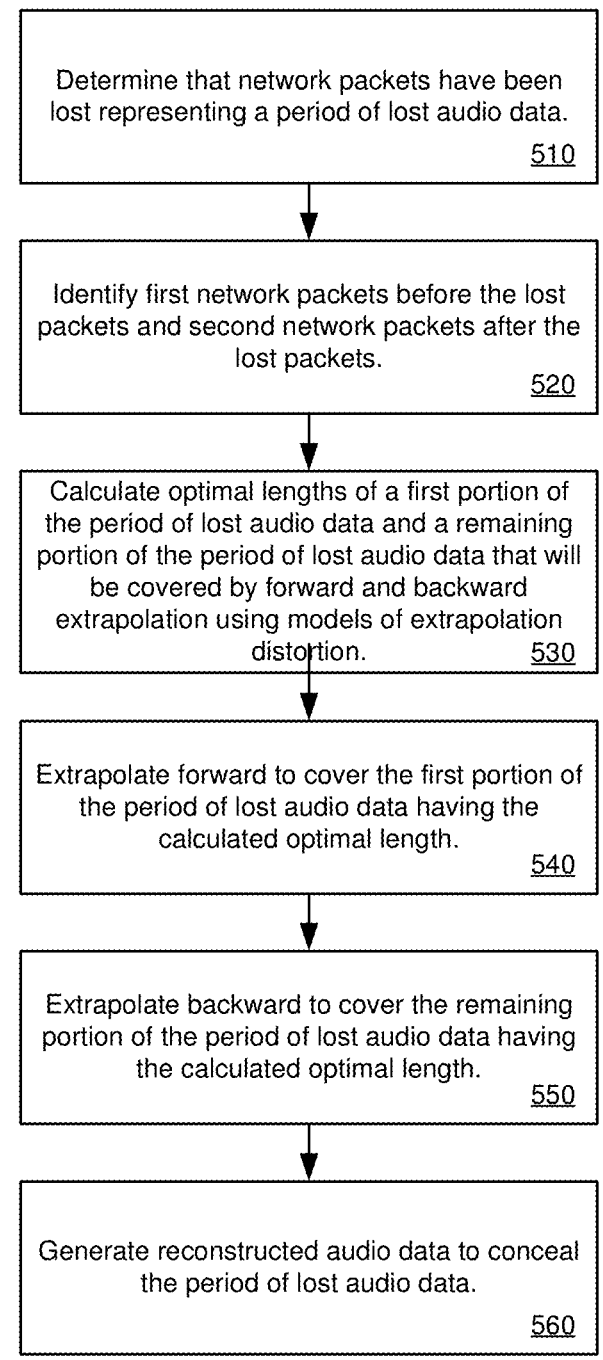
FIG. 5 is a flowchart of an example method for performing forward and backward extrapolation of data, including using models of extrapolation distortion.

FIG. 5 is a flowchart of an example method 500 for performing forward and backward extrapolation of audio data (e.g., for data received via a computer network), including using models of extrapolation distortion. For example, the example method 500 can be performed by a computing device, such as receiving device 210.

At 510, a determination is made that one or more network packets have been lost. The lost network packets represent a period of lost audio data. For example, the lost audio data could be one or more frames of audio data.

At 520, one or more first network packets before the lost packets and one or more second network packets after the lost packets are identified. The one or more network packets before the lost packets are labeled "first" network packets for ease of reference. Similarly, the one or more network packets after the lost packets are labeled "second" network packets for ease of reference.

At 530 through 550, forward and backward extrapolation for network packet loss concealment is performed. Specifically, at 530, optimal lengths of a first portion of the period of lost audio data and a remaining portion of the period of lost audio data that will be covered by the forward and backward extrapolation are calculated using models of extrapolation distortion.

In some implementations, calculating the optimal lengths using the models of extrapolation distortion comprises generating a model (e.g., a function) of extrapolation distortion for each of the forward and backward extrapolations. For example, a first model of extrapolation distortion can be generated for the forward extrapolation as a function of speech parameters used for the forward extrapolation and a length of the forward extrapolation. A second model of extrapolation distortion can be generated for the backward extrapolation as a function of speech parameters used for the backward extrapolation and a length of the backward extrapolation. A minimum overall distortion can then be calculated between the models of extrapolation distortion for the forward and backward directions. The optimal lengths can be determined as those lengths that produce the minimum extrapolation distortion.

At 540, forward extrapolation is performed to cover the first portion of the period of lost audio data having the calculated optimal length for the forward direction. At 550 backward extrapolation is performed to cover the remaining portion of the period of lost audio data having the calculated optimal length for the backward direction.

At 560, reconstructed audio data is generated to conceal the period of lost audio data based at least in part on the extrapolated first portion and the extrapolated remaining portion. For example, the extrapolation can reconstruct audio data (e.g., audio samples) and/or audio parameters (e.g., speech parameters) that are used to fill in the lost audio data. The reconstructed audio data can be saved or used for playback.

In some implementations, the method (e.g., example method 300, 400, or 500) evaluates different packet loss concealment techniques and decides which to perform. For example, the method can determine whether to perform interpolation or forward and backward extrapolation for the period of lost data. The determination can be based at least in part on the difference between the information in the network packets before the period of lost data and the information in the network packets after the period of lost data (e.g., based on evaluating the data itself and/or parameters representing the data). For example, a change amount can be calculated that indicates the difference. A high difference can indicate that interpolation would not produce a good result. Therefore, if the change amount is above a threshold value, then the decision can be made to perform forward and backward extrapolation instead of interpolation. Otherwise, if the change amount is not above the threshold value, then the decision can be made to perform interpolation instead of forward and backward extrapolation.

Computing Systems

Figure 7:
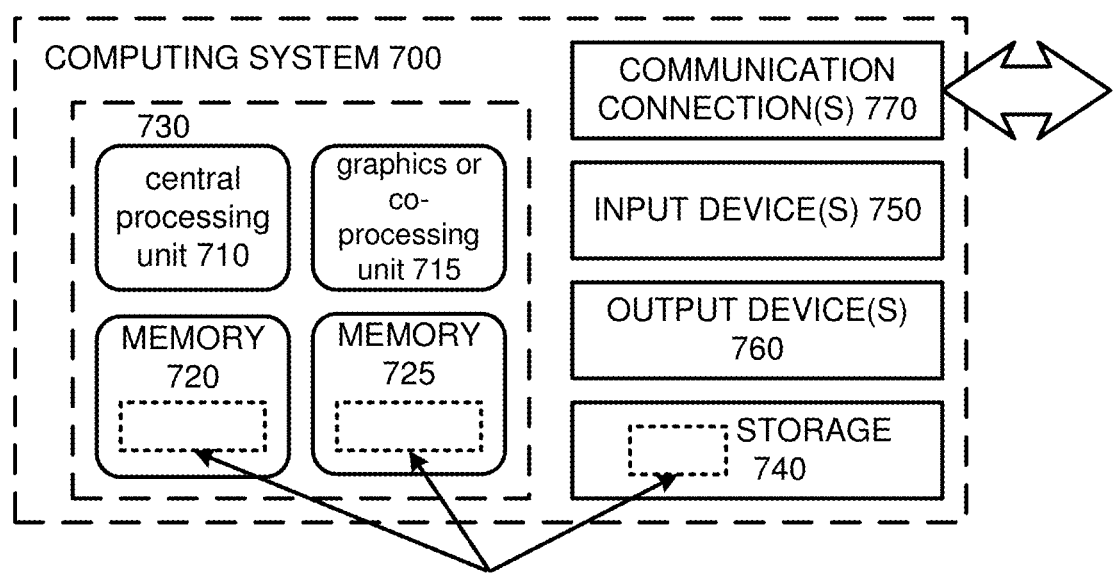
FIG. 7 is a diagram of an example computing system in which some described embodiments can be implemented.

FIG. 7 depicts a generalized example of a suitable computing system 700 in which the described technologies may be implemented. The computing system 700 is not intended to suggest any limitation as to scope of use or functionality, as the technologies may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more technologies described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information and which can be accessed within the computing system 700. The storage 740 stores instructions for the software 780 implementing one or more technologies described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 8:
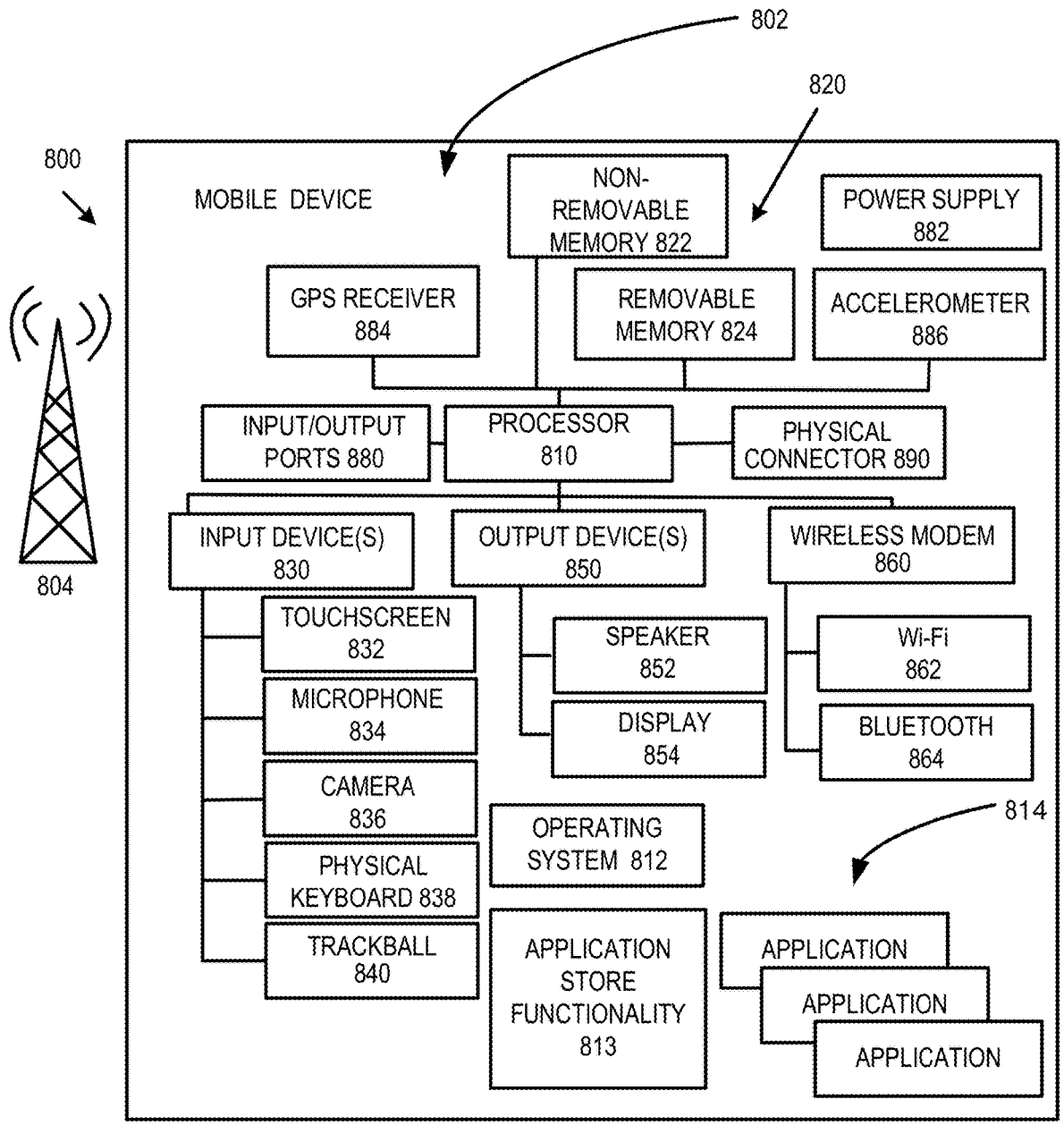
FIG. 8 is an example mobile device that can be used in conjunction with the technologies described herein.

FIG. 8 is a system diagram depicting an example mobile device 800 including a variety of optional hardware and software components, shown generally at 802. Any components 802 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 804, such as a cellular, satellite, or other network.

The illustrated mobile device 800 can include a controller or processor 810 (e.g., signal processor, microprocessor, ASIC, or other control and processing logic circuitry) for performing such tasks as signal coding, data processing, input/output processing, power control, and/or other functions. An operating system 812 can control the allocation and usage of the components 802 and support for one or more application programs 814. The application programs can include common mobile computing applications (e.g., email applications, calendars, contact managers, web browsers, messaging applications), or any other computing application. Functionality 813 for accessing an application store can also be used for acquiring and updating application programs 814.

The illustrated mobile device 800 can include memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in GSM communication systems, or other well-known memory storage technologies, such as "smart cards." The memory 820 can be used for storing data and/or code for running the operating system 812 and the applications 814. Example data can include web pages, text, images, sound files, video data, or other data sets to be sent to and/or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 800 can support one or more input devices 830, such as a touchscreen 832, microphone 834, camera 836, physical keyboard 838 and/or trackball 840 and one or more output devices 850, such as a speaker 852 and a display 854. Other possible output devices (not shown) can include piezoelectric or other haptic output devices. Some devices can serve more than one input/output function. For example, touchscreen 832 and display 854 can be combined in a single input/output device.

The input devices 830 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can comprise input devices and software that allows for user interaction via a user's spatial gestures, such as detecting and interpreting gestures to provide input to a gaming application.

A wireless modem 860 can be coupled to an antenna (not shown) and can support two-way communications between the processor 810 and external devices, as is well understood in the art. The modem 860 is shown generically and can include a cellular modem for communicating with the mobile communication network 804 and/or other radio-based modems (e.g., Bluetooth 864 or Wi-Fi 862). The wireless modem 860 is typically configured for communication with one or more cellular networks, such as a GSM network for data and voice communications within a single cellular network, between cellular networks, or between the mobile device and a public switched telephone network (PSTN).

The mobile device can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components 802 are not required or all-inclusive, as any components can be deleted and other components can be added.

Cloud-Supported Environment

Figure 9:
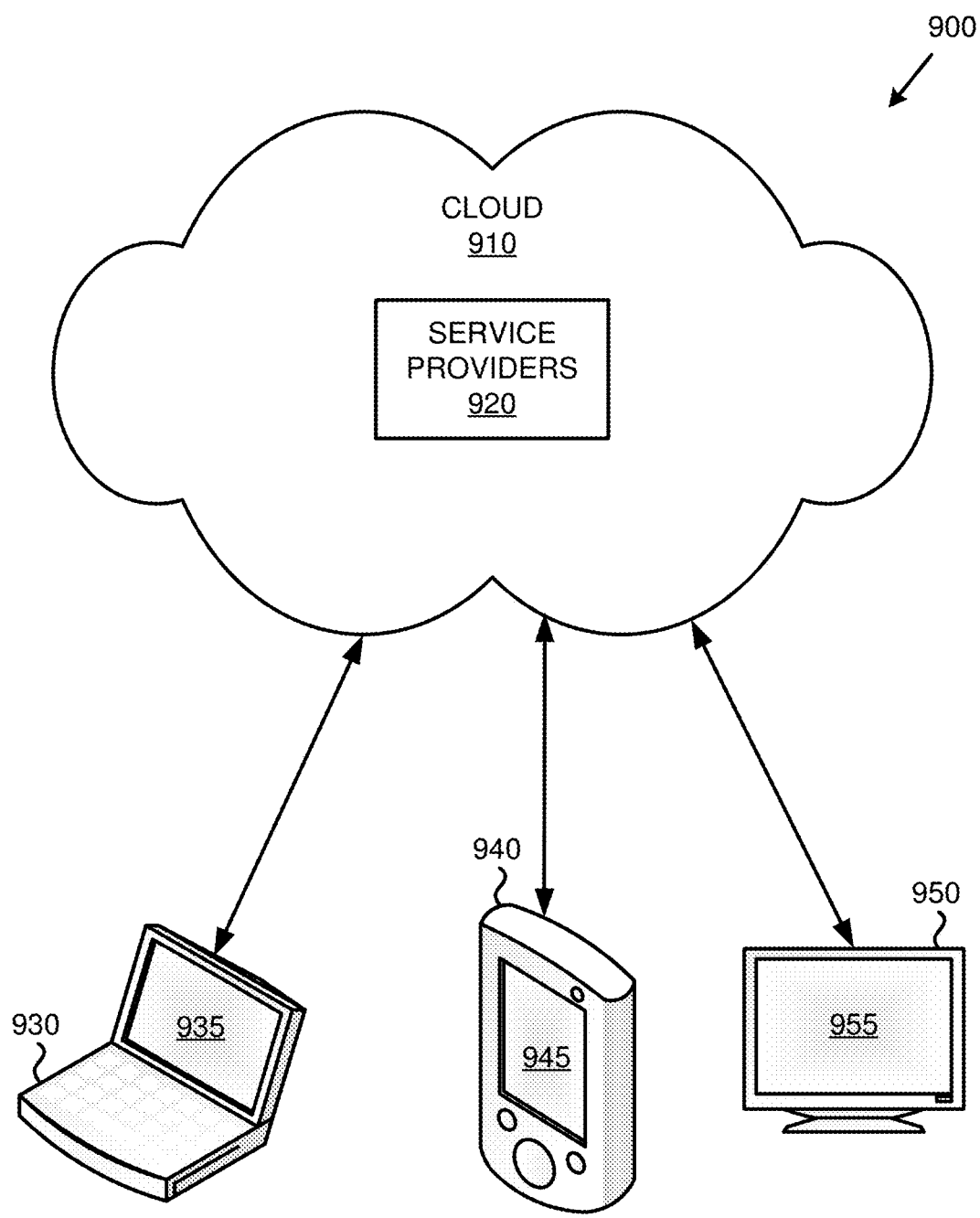
FIG. 9 is an example cloud-support environment that can be used in conjunction with the technologies described herein.

FIG. 9 illustrates a generalized example of a suitable cloud-supported environment 900 in which described embodiments, techniques, and technologies may be implemented. In the example environment 900, various types of services (e.g., computing services) are provided by a cloud 910. For example, the cloud 910 can comprise a collection of computing devices, which may be located centrally or distributed, that provide cloud-based services to various types of users and devices connected via a network such as the Internet. The implementation environment 900 can be used in different ways to accomplish computing tasks. For example, some tasks (e.g., processing user input and presenting a user interface) can be performed on local computing devices (e.g., connected devices 930, 940, 950) while other tasks (e.g., storage of data to be used in subsequent processing) can be performed in the cloud 910.

In example environment 900, the cloud 910 provides services for connected devices 930, 940, 950 with a variety of screen capabilities. Connected device 930 represents a device with a computer screen 935 (e.g., a mid-size screen). For example, connected device 930 could be a personal computer such as desktop computer, laptop, notebook, netbook, or the like. Connected device 940 represents a device with a mobile device screen 945 (e.g., a small size screen). For example, connected device 940 could be a mobile phone, smart phone, personal digital assistant, tablet computer, and the like. Connected device 950 represents a device with a large screen 955. For example, connected device 950 could be a television screen (e.g., a smart television) or another device connected to a television (e.g., a set-top box or gaming console) or the like. One or more of the connected devices 930, 940, 950 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 900. For example, the cloud 910 can provide services for one or more computers (e.g., server computers) without displays.

Services can be provided by the cloud 910 through service providers 920, or through other providers of online services (not depicted). For example, cloud services can be customized to the screen size, display capability, and/or touchscreen capability of a particular connected device (e.g., connected devices 930, 940, 950).

In example environment 900, the cloud 910 provides the technologies and solutions described herein to the various connected devices 930, 940, 950 using, at least in part, the service providers 920. For example, the service providers 920 can provide a centralized solution for various cloud-based services. The service providers 920 can manage service subscriptions for users and/or devices (e.g., for the connected devices 930, 940, 950 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 7, computer-readable storage media include memory 720 and 725, and storage 740. By way of example and with reference to FIG. 8, computer-readable storage media include memory and storage 820, 822, and 824. The term computer-readable storage media does not include signals and carrier waves. In addition, the term computer-readable storage media does not include communication connections, such as 770, 860, 862, and 864.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
   a processor;
   a network connection; and
   memory;
   the computing device configured, via computer-executable instructions, to perform operations for forward and backward extrapolation of data, the operations comprising:
      determining that one or more network packets have been lost, the one or more lost network packets representing a period of lost data;
      identifying one or more first network packets before the one or more lost network packets and one or more second network packets after the one or more lost network packets;
      performing forward and backward extrapolation, comprising:
         extrapolating forward from data of the one or more first network packets to cover a first portion of the period of lost data; and
         extrapolating backward from data of the one or more second network packets to cover a remaining portion of the period of lost data; and
      reconstructing the lost data based at least in part on the extrapolated first portion and the extrapolated remaining portion.

2. The computing device of claim 1, the operations further comprising:
   determining a similarity measure for each of the one or more first network packets and the one or more second network packets;
   based on the similarity measures:
      when the one or more first network packets have a higher similarity measure, the first portion of the period of lost data covered by the forward extrapolation is more than half of the period of lost data, and the remaining portion of the period of lost data covered by the backward extrapolation is less than half of the period of lost data; and
      when the second one or more network packets have a higher similarity measure, the remaining portion of the period of lost data covered by the backward extrapolation is more than half of the period of lost data, and the first portion of the period of lost data covered by the forward extrapolation is less than half of the period of lost data.

3. The computing device of claim 1, the operations further comprising:
   at a point within the period of lost data where the forward and backward extrapolation meet, performing a smoothing operation.

4. The computing device of claim 3, wherein performing the smoothing operation comprises:
   performing an overlap-add.

5. The computing device of claim 1 wherein the data is streaming audio data, and wherein performing the forward and backward extrapolation comprises:
   extrapolating audio parameters for the forward and backward extrapolation to conceal the period of lost data.

6. The computing device of claim 1 wherein the data is frames of streaming audio data that have been encoded using an audio codec, and wherein performing the forward and backward extrapolation comprises:
   extrapolating audio parameters for the forward and backward extrapolation to conceal one or more frames of the period of lost streaming audio data.

7. The computing device of claim 1 wherein performing the forward and backward extrapolation further comprises:
   using one or more models of extrapolation distortion to calculate optimal lengths of the first portion that will be covered by the forward extrapolation and the remaining portion that will be covered by the backward extrapolation.

8. The computing device of claim 7 wherein two models of extrapolation distortion are used, one for modeling distortion for the forward extrapolation and one for modeling distortion for the backward extrapolation, and wherein using the two models of extrapolation distortion to calculate the optimal lengths comprises:
   calculating the optimal lengths using a function that minimizes overall distortion of the two models of extrapolation distortion.

9. The computing device of claim 1 wherein the data is audio data, and wherein performing the forward and backward extrapolation further comprises:
   calculating an optimal length of the first portion and an optimal length of the remaining portion using models of extrapolation distortion, comprising:
      for each of the forward and backward extrapolation, generating a model of extrapolation distortion as a function of speech parameters used for the extrapolation and a length of the extrapolation; and calculating a minimum of overall distortion between the models of extrapolation distortion.

10. The computing device of claim 1, the operations further comprising:
determining whether to perform interpolation for the period of lost data based at least in part on a change amount indicating a difference between the one or more first network packets before the one or more lost network packets an the one or more second network packets after the one or more lost network packets; and
when the change amount is above a threshold value, deciding to perform forward and backward extrapolation instead of interpolation to cover the period of lost data.

11. The computing device of claim 1 wherein the data is streaming audio data that is encoded according to an audio codec, and wherein network packets of the streaming audio data are received by the computing device via a real-time network protocol for streaming media.

12. A method, implemented by a computing device, for performing forward and backward extrapolation of audio data, the method comprising:
determining that one or more network packets have been lost, the one or more lost network packets representing a period of lost audio data;
identifying one or more first network packets before the one or more lost network packets and one or more second network packets after the one or more lost network packets;
performing forward and backward extrapolation for network packet loss concealment, comprising:
extrapolating forward from audio data of the one or more first network packets to cover a first portion of the period of lost audio data; and
extrapolating backward from audio data of the one or more second network packets to cover a remaining portion of the period of lost audio data; and
reconstructing the lost audio data based at least in part on the extrapolated first portion and the extrapolated remaining portion;
wherein the extrapolated first portion and the extrapolated second portion cover the period of lost audio data.

13. The method of claim 12, further comprising:
determining a similarity measure for each of the one or more first network packets and the one or more second network packets;
based on the similarity measures:
when the one or more first network packets have a higher similarity measure, the first portion of the period of lost audio data covered by the forward extrapolation is more than half of the period of lost audio data, and the remaining portion of the period of lost audio data covered by the backward extrapolation is less than half of the period of lost audio data; and
when the second one or more network packets have a higher similarity measure, the remaining portion of the period of lost audio data covered by the backward extrapolation is more than half of the period of lost audio data, and the first portion of the period of lost audio data covered by the forward extrapolation is less than half of the period of lost audio data.

14. The method of claim 12, further comprising:
at a point within the period of lost audio data where the forward and backward extrapolation meet, performing a smoothing operation.

15. The method of claim 12 wherein performing the forward and backward extrapolation further comprises:
using one or more models of extrapolation distortion to calculate optimal lengths of the first portion that will be covered by the forward extrapolation and the remaining portion that will be covered by the backward extrapolation.

16. The method of claim 12 wherein performing the forward and backward extrapolation further comprises:
calculating an optimal length of the first portion and an optimal length of the remaining portion using models of extrapolation distortion, comprising:
for each of the forward and backward extrapolation, generating a model of extrapolation distortion as a function of speech parameters used for the extrapolation and a length of the extrapolation; and
calculating a minimum of overall distortion between the models of extrapolation distortion.

17. The method of claim 12, further comprising:
determining whether to perform interpolation for the period of lost audio data based at least in part on a change amount indicating a difference between the one or more first network packets before the one or more lost network packets an the one or more second network packets after the one or more lost network packets; and
when the change amount is above a threshold value, deciding to perform forward and backward extrapolation instead of interpolation to cover the period of lost audio data.

18. A method, implemented by a computing device, for performing forward and backward extrapolation of audio data, the method comprising:
determining that one or more network packets have been lost, the one or more lost network packets representing a period of lost audio data;
identifying one or more first network packets before the one or more lost network packets and one or more second network packets after the one or more lost network packets;
performing forward and backward extrapolation for network packet loss concealment, comprising:
calculating optimal lengths of a first portion of the period of lost audio data that will be covered by the forward extrapolation and a remaining portion of the period of lost audio data that will be covered by the backward extrapolation using one or more models of extrapolation distortion;
extrapolating forward from audio data of the one or more first network packets to cover the first portion of the period of lost audio data having the calculated optimal length of the forward extrapolation; and
extrapolating backward from audio data of the one or more second network packets to cover the remaining portion of the period of lost audio data having the calculated optimal length of the backward extrapolation; and
generating reconstructed audio data to conceal the period of lost audio data based at least in part on the extrapolated first portion and the extrapolated remaining portion.

19. The method of claim 18, further comprising:
determining whether to perform interpolation for the period of lost audio data based at least in part on a change amount indicating a difference between the one or more first network packets before the one or more lost network packets an the one or more second network packets after the one or more lost network packets; and when the change amount is above a threshold value, deciding to perform forward and backward extrapolation instead of interpolation to cover the period of lost audio data.

20. The method of claim 18 wherein calculating the optimal length of the first portion and the optimal length of the remaining portion using the models of extrapolation distortion comprises:

for each of the forward and backward extrapolation, generating a model of extrapolation distortion as a function of speech parameters used for the extrapolation and a length of the extrapolation; and calculating a minimum of overall distortion between the models of extrapolation distortion.

* * * * *